(12) United States Patent
Lee (10) Patent No.: US 11,377,234 B2
(45) Date of Patent: Jul. 5, 2022

(54) REUSABLE SPACE TRANSPORT VEHICLE WITH MODULAR NETWORKED ROCKET PROPULSION

(71) Applicant: Joseph G. Lee, Fullerton, CA (US)

(72) Inventor: Joseph G. Lee, Fullerton, CA (US)

(*) Notice: Subject to any disclaimer, the term of this patent is extended or adjusted under 35 U.S.C. 154(b) by 371 days.

(21) Appl. No.: 16/830,138

(22) Filed: Mar. 25, 2020

(65) Prior Publication Data

US 2021/0300596 A1    Sep. 30, 2021

(51) Int. Cl.
| | |
|---|---|
| *B64G 1/00* | (2006.01) |
| *B64G 1/40* | (2006.01) |
| *F02K 9/46* | (2006.01) |
| *B64G 1/60* | (2006.01) |
| *B64G 99/00* | (2009.01) |
| *B64G 5/00* | (2006.01) |

(52) U.S. Cl.
CPC ............ *B64G 1/002* (2013.01); *B64G 1/401* (2013.01); *B64G 1/402* (2013.01); *B64G 1/60* (2013.01); *B64G 5/00* (2013.01); *B64G 9/00* (2013.01); *F02K 9/46* (2013.01)

(58) Field of Classification Search
CPC ........ B64G 1/002; B64G 1/401; B64G 1/402; B64G 1/60; B64G 5/00; B64G 9/00; F02K 9/46
See application file for complete search history.

(56) References Cited

U.S. PATENT DOCUMENTS 10,717,550 B1 *   7/2020   Zegler ...................... F02K 9/44

FOREIGN PATENT DOCUMENTS

| CN | 108657465 A | * | 10/2018 | |
| EP | 3653516 A1 | * | 5/2020 | ............. B64G 1/002 |
| FR | 2921979 A1 | * | 4/2009 | ............... F02K 9/46 |

* cited by examiner

*Primary Examiner* — Valentina Xavier
(74) *Attorney, Agent, or Firm* — Averill & Green; Kenneth L. Green (57) ABSTRACT

A rocket-powered space launch system comprises both a vehicle segment with an integrally designed propulsion subsystem and a supporting ground facility segment. Elements of a propulsion unit as easily accessed for removal and replacement of individual components. Said launch system is highly reusable, operable, and facilitates governmental agency regulatory compliant safety of occupants and public without passenger escape function and/or commanded vehicle destruction.

14 Claims, 8 Drawing Sheets

REUSABLE SPACE TRANSPORT VEHICLE WITH MODULAR NETWORKED ROCKET PROPULSION

BACKGROUND OF THE INVENTION

The present invention relates to space transportation and in particular to an improvements to reusable rocket vehicle propulsion.

The difficulties which obstruct the pathway to success in a truly reusable space transportation-machine construction are of four general classes: 1. a vehicle architecture which is reusable and economically viability; 2. a flight vehicle with rocket propulsion element which is reliable, economically developed and manufactured, and highly operable and maintainable; 3. a vehicle architecture that is scalable; and 4. a g round support facility which accommodates the vehicle pre-launch functions, the rocket propulsion exhaust, and allows for a takeoff, lateral wind drift, and immediate flight abort maneuvers. Overcoming these difficulties requires improved reliability, increased occupant and public safety, and significantly lower per flight costs.

Known launch vehicle design philosophies and system technologies are founded in the development and evolution of machines originally intended for military purposes, for example, non-reusable missiles or warhead delivery devices. As such, they continue to be designed and operated as very high value, complex, and capable expendable items. This is indicated by the continued use of the popular Atlas and Delta derived vehicles, the Soyuz and Ariane launch systems, all Chinese launchers, as well as new development programs such as the Orbital/ATK Antares, Space-X Falcon family, NASA's SLS, and multiple small launch systems.

Expendable launch vehicle elements which are 'optionally recoverable' and refurbished for a small number of multiple flights are ultimately expendable.

Current and planned variants of the basic expendable multi-stage missile vehicle do not lead to future, highly reusable evolutions for the following reasons:

1. Rocket-powered launch vehicle prior art is generally presented as a description of a unique physical configuration (ornamental designs) without explaining how the physical configuration and/or derived functions result in a practical and/or economically viable product or service. Most prior art of rocket vehicles labeled 'reusable' are presented without explaining, specifically or generally, as to how such reusability is actually designed and practiced. Concepts brought to practice have resulted in vehicles which are 'potentially reusable', 'recoverable', and/or 'reusable with extensive refurbishment efforts'. This fact is primarily expressed, operationally and by regulatory agency approval process, by the presence of a 'flight termination' device and/or means of passenger 'escape'. Such system features are specifically intended for instances when the vehicle will not be reusable;

2. The physical support and integration of the launch vehicle element to the ground support element is designed in a manner that restricts the vehicle from low level flight aborts. In other words, the interfaces are designed and function in such a manner as to NOT allow the vehicle to safely return to rest upon the provided launch support once it moves upwards a very small distance (typically less than twelve (12) inches of vertical motion). There are additional horizontal movement restrictions as well which complicate the vehicle flight control and limit the wind or wind gust which may be present at launch;

3. Rocket-powered system architecture has focused on the development and use of discrete propulsion units consisting of integrated thrust chambers, turbomachinery propellant pumps and associated fluid control devices:

A) This has proven to be an acceptable solution for expendable launch vehicles. It allows a 'generic' engine unit to be developed relatively independently from a launch vehicle of a general class of payload delivery capability. Discrete units of thrust are applied as necessary. With respect to the selection of primary propulsion for a highly reusable rocket system we have a limited number of historical examples, one application example being the NASA Space Shuttle. When bell nozzle and aerospike propulsion schemes where evaluated for the NASA Space Shuttle program it appeared that the 'heritage' of bell nozzle rocket propulsion technology weighed heavily on the decision. Furthermore, a desire to actually 'disconnect' the vehicle configuration from the propulsion solution was another key factor in not selecting the aerospike approach. Unfortunately, there appears to have been little serious evaluation of which solution would be more operable, maintainable, and capable of evolving into a propulsion system applicable to the reusability goals envisioned for the Space Shuttle program;

B) Rocket engines are not typically designed nor installed in the vehicle in a manner which supports the level of ground operations and maintenance necessary for a highly reusable vehicle, such as a commercial airliner. The Space Shuttle Orbiter attempted to reuse a set of three discrete engines with arguable success given that the engines were required to be removed from the Orbiter between each flight. Upgraded engines with a goal of just 10 missions between overhaul were introduced in 2007 well after the program's peak average flight rate of 7.2 per year from 1992 through 1997 had dropped to just 3.6 flights per year. These flight rates are quite low and the system was not economically viable compared to expendable vehicle solutions for either crew or payload delivery to low-earth orbit. Some launch vehicles with single use upper stage may have their booster stage(s) recovered downrange. This opens the opportunity to be "optionally reusable". Reuse involves a case-by-case evaluation of condition and necessary refurbishment is performed in an 'off-line' process. For example: Booster 001 completes a mission planned for recovery. If the recovery is successful Booster 001 is entered into a refurbishment process. Booster 002 through 00X (new or refurbished) performs the next scheduled mission(s). When or if Booster 001 is readied for another mission, it is scheduled into the mission roster weeks or months into the future. While some economic advantage may be gained, depending on refurbishment cost and actual reliability of reused hardware determined, these vehicles are fairly dependent upon their non-reusability and/or the expending of vehicle stages and/or major system components (see US Published Patent Application Serial No. 2010/0326045) to maintain a manufacturing production line for replacement vehicles and hardware effecting the production cost at levels which could not be sustained if the vehicles were factually reusable for a defined, relatively high (>100) number of missions/flight cycles. An increase in unit cost as production demand decreases (increased reliability and reuse) can be magnified in highly vertically integrated business organizations;

C. Discrete rocket engines have historically been very costly and time consuming products to design and development to a flight ready state. Combustion devices are generally found to be NOT easily scaled and large engines are costly to ground test. Once developed, typically with government agency financial participation, they persist as highly proprietary and technology fixed products due to issues associated with maintaining certification (by observed test results and/or "flight leader" methodology). Furthermore, it could be theorized, that the developing agencies (both governmental and commercial) can use the high cost and proprietary nature of the product as a 'barrier to entry' for potential market competitors.

In conclusion, it should be noted that historical rocket powered launch vehicle reliability (mission success) for both manned and cargo missions from 1964 to 2017 was approximately 97%. In contrast—commercial aircraft mission success during the same time period has been on the order of 99.99%. Providing high rate, commercial passenger transport using rocket powered vehicles will require, and likely be demanded by the public, and subsequently by governmental regulatory agencies, that this reliability gap be addressed. Closing that large gap between prior art rocket vehicles and passenger carrying aircraft must be accomplished through a significant change in system design philosophy and methodology, vehicle and ground facility architecture, and rocket engine propulsion.

BRIEF SUMMARY OF THE INVENTION

The present invention addresses the above and other needs by providing a rocket-powered space launch system comprising both a vehicle segment with an integrally designed yet modular propulsion subsystem and a supporting ground facility segment. Elements of a propulsion unit as easily accessed for removal and replacement. Said launch system is highly reusable, operable, and facilitates governmental agency regulatory compliant safety of occupants and public without passenger escape function and/or commanded vehicle destruction.

In accordance with one aspect of the invention, there is provided a vehicle having a plurality of Thrust Chamber Units (TCUs) arranged around a perimeter of a primary propulsion unit, the TCUs individually removable and replaceable while the vehicle resides on a Ground Operations Facility Segment (GOFS) in a launch configuration.

In accordance with another aspect of the invention, there is provided a vehicle having a plurality of fluid pumps in fluid communication between at least one propellant tank and said TCUs through flow control valves individually removable and replaceable, and pumps individually removable and replaceable.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

Figure 1:
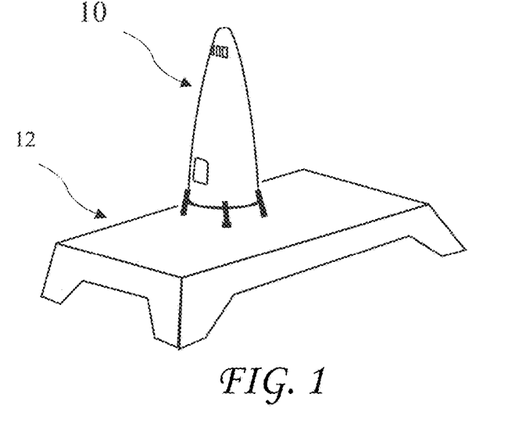
FIG. 1 shows a single stage, suborbital, passenger carrying, Vertical Takeoff and Vertical Landing (VTVL) vehicle and a Ground Operations Facility Segment (GOFS) according to the present invention.

FIG. 1 shows a single stage, suborbital, passenger carrying, Vertical Takeoff and Vertical Landing (VTVL) vehicle 10 and a Ground Operations Facility Segment (GOFS) 12. Both the vehicle 10 and GOFS 12 are designed to support a flight rate of at least one mission per day by the specific design features as described in this embodiment. The vehicle 10, with extended landing gear 20 (see FIG. 2), rests upon the GOFS 12 with no physical locating pins or hold-down mechanisms connecting the vehicle 10 to the GOFS 12.

Alternative embodiments the vehicle 10 may be multiple staged in series or parallel configuration and used for earth-to-earth (suborbital) and low earth orbit insertion (orbital) applications. Further embodiments may include vehicles designed solely for operation in space for lunar or interplanetary travel.

Figure 2:
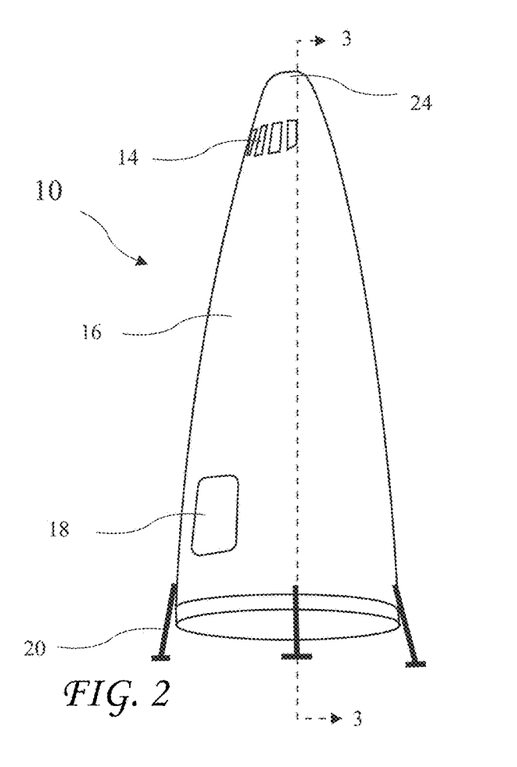
FIG. 2 shows a perspective view of a two passenger suborbital flight vehicle according to the present invention.

A perspective view of a two passenger suborbital flight vehicle 10 is shown in FIG. 2. The vehicle 10 comprises a Passenger (PAX) or Payload/Cargo (PLC) accommodation capsule 14 having physical mechanical and electrical interfaces facilitating operational removal from a vehicle airframe 16. Multiple body flaps 18 provide aerodynamic control surfaces for base first atmospheric flight. At least three, and preferably four, landing gear 20 are retractable and extendable during flight and used for both takeoff and landing events. A Reaction Control Subsystem (RCS) 24 is a typical arrangement of gas thrusters and associated control valves to provide vehicle attitude control and stabilization during flight phases with low aerodynamic forces acting upon the vehicle.

Figure 3:
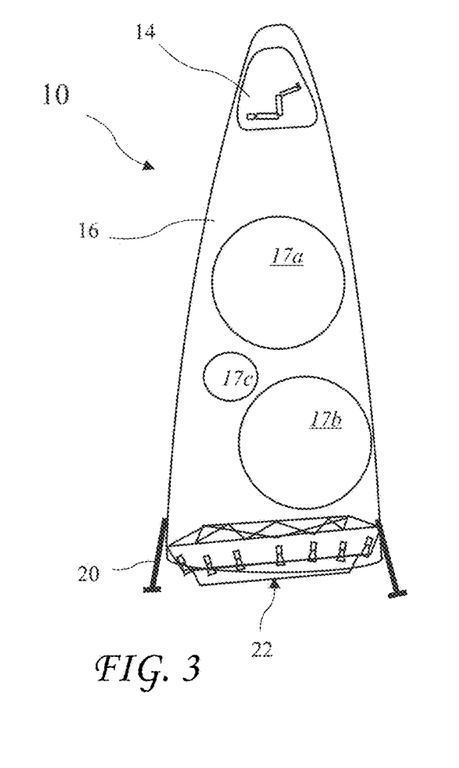
FIG. 3 shows a cross-section view of the flight vehicle according to the present invention taken along line 3-3 of FIG. 2.

FIG. 3 is a cross-section view of the vehicle 10 taken along line 3-3 of FIG. 2, and illustrates the interior arrangement of the various vehicle 10 features. A Primary Propulsion Unit (PPU) 22 comprising assembly of thrust units, thrust frame, propellant pumping and distribution components and atmospheric pressure compensating nozzle mounted to the vehicle airframe 16. Propellant tanks 17a and 17b, and pressurization tank 17c, are integrated into the vehicle airframe 16 via secondary structures, for example, a spherical Liquid Oxygen (LOX) oxidizer tank 17a with common bulkhead to the liquid natural gas (LNG) fuel tank 17b. Multiple spherical pressure vessels 17c containing the Gaseous Nitrogen (GN2) pressurant gas may reside in the vehicle 10. Alternative embodiments may use different propellant combinations or pressurant gas or have propellant tanks of alternative configuration with or without common bulkheads with tank walls being conformal to and/or comprising the function of, the vehicle's Outer Mold Line (OML).

Figure 4:
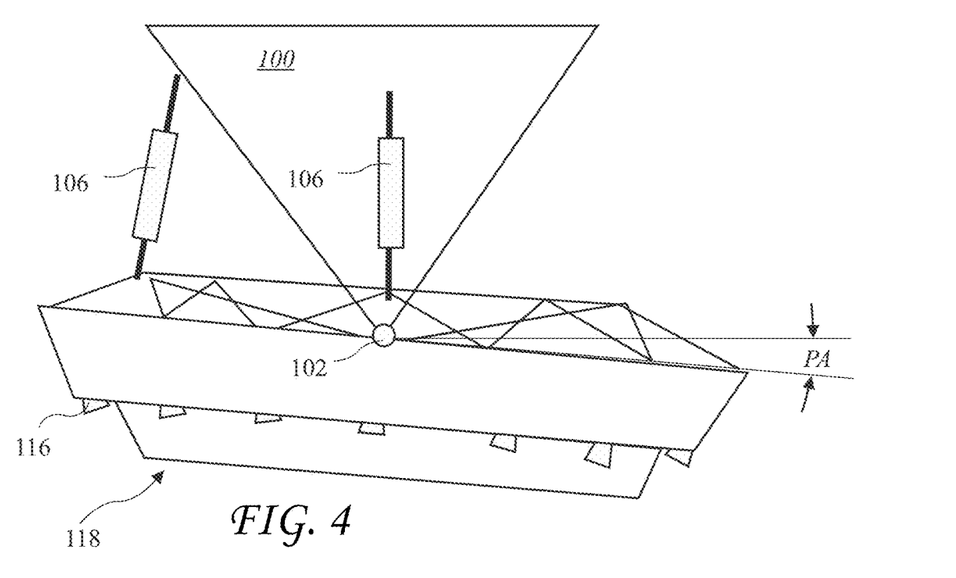
FIG. 4 shows a propulsion unit of the flight vehicle having a gimbaled thrust vector control according to the present invention.
Figure 5:
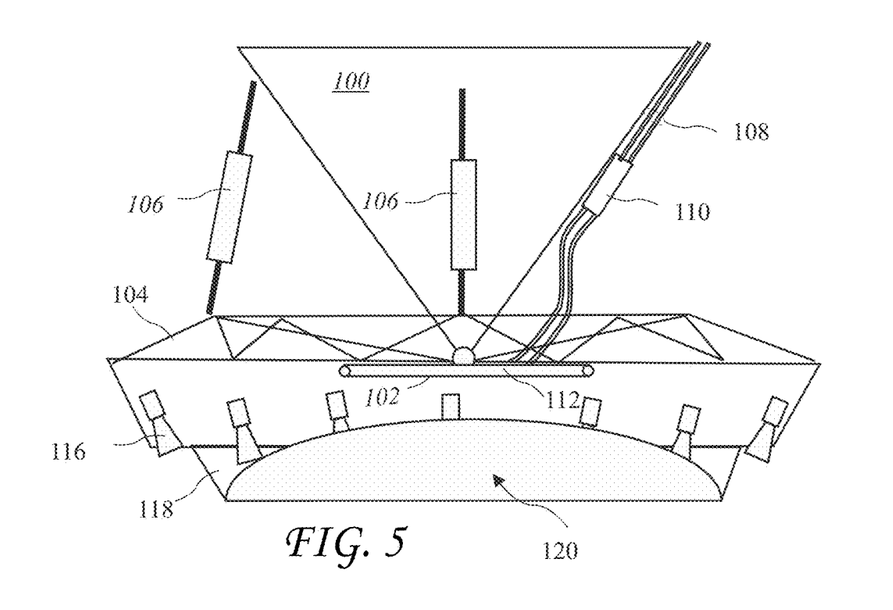
FIG. 5 shows a physical arrangement a primary propulsion unit according to the present invention.

The PPU 22 thrust force is transferred to the vehicle airframe thrust structure 100 through a ball joint 102 as shown in FIG. 4 and FIG. 5 shows a physical arrangement the PPU 55. Thrust Vector Control (TVC) during powered forward flight is achieved by rotating the PPU 22 about the ball joint 102 relative to a plane normal to the vehicle centerline via two linear, electromechanical actuators 106 placed at 0 and 90 degrees in a plane normal to the vehicle centerline pivot the PPU 22 a pivot angle PA. The pivot angle PA is preferably between 3 and 6 degrees, and more preferably about +/− 5 degrees from the vehicle 10 centerline. Alternative TVC embodiments may use more than one pivot point and/or multiple actuators in various configurations or may have the engine fixed to the vehicle airframe and use differential throttle and/or aerodynamic devices to change the direction of the PPU 22 thrust vector.

The PPU 22 includes a thrust frame 104 which transfers generated thrust force to the vehicle airframe thrust structure 100 via the ball joint 102. Pivotal control force is provided by the two linear actuators 106. A Zero Length Nozzle (ZLN) 118 is structurally integrated to the thrust frame 104 with the central area of the ZLN 118 aft facing area is closed out with a radiant cooled Base Nozzle Dome (BND) 120. Propellants, oxidizer and fuel, are routed from the propellant tanks 17a and 17b via feedlines 108 through an isolation valve 110 to a low pressure manifold 112.

Figure 6A:
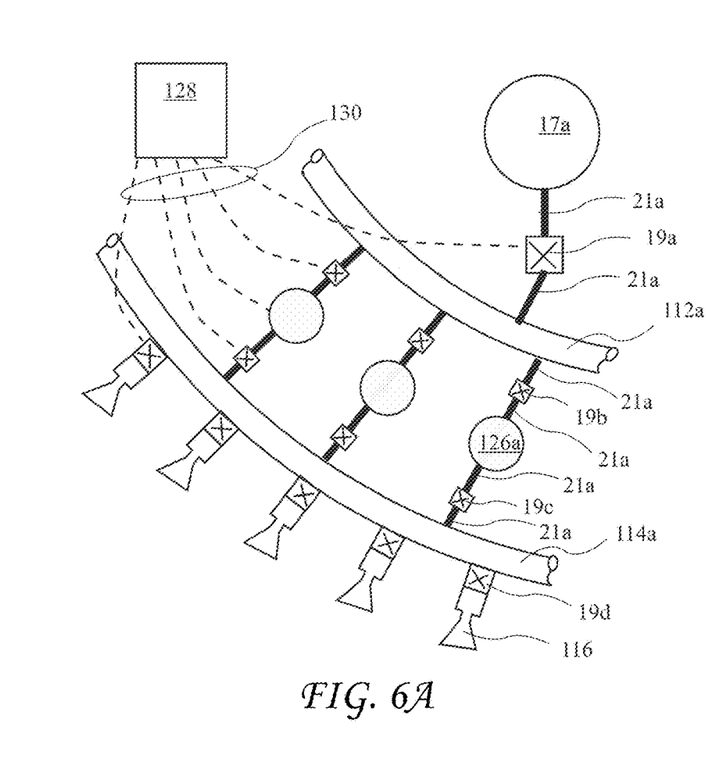
FIG. 6A shows engine control and vehicle monitoring control for an oxidizer flow according to the present invention.

Engine control and vehicle monitoring is shown in FIGS. 6A for an oxidizer flow. Oxidizer is passed through oxidizer line 21a from an oxidizer tank 17a through a first valve 19a to a low pressure manifold 112a. The oxidizer is then passed through second valves 19b, pumps 126a, and third valves 19c to a high pressure manifold 114a. The oxidizer then passes through fourth valve 19d into Thrust Chamber Units (TCUs) 116. A control and monitoring system 128 controls the valves 19a-19d and pumps 126a to control the flow of propellant to the TCUs 116 through interfaces 130.

Figure 6B:
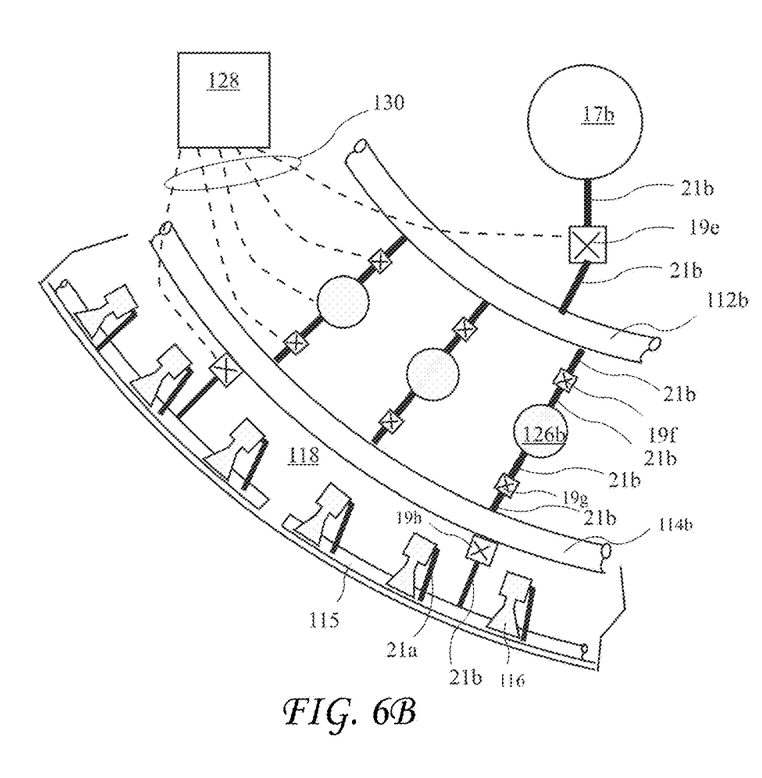
FIG. 6B shows engine control and vehicle monitoring control for a fuel flow according to the present invention

Engine control and vehicle monitoring is shown in FIGS. 6B for a fuel flow. Fuel is passed through fuel line 21b from a fuel tank 17b through a fifth valve 19e to a low pressure manifold 112b. The fuel is then passed through sixth valves 19f, pumps 126b, and seventh valves 19g to a high pressure manifold 114b. The fuel then passes through eighth valve 19h to one of a plurality of ZLN sector manifolds 115, and through the ZLN 118 and into TCUs 116. The fuel flow through the ZLN 118 provides cooling to the ZLN 118. The control and monitoring system 128 controls the valves 19e-19h and pumps 126b to control the flow of propellant to the TCUs 116 through interfaces 130.

The manifolds 112a, 112b, 114a, and 114b form closed circuits, i.e., the manifolds are a complete circle with no interruptions. Alternative embodiments of the PPU 22 shape and integrated arrangement of the PPU could be non-circular or segments of manifolds 112a, 112b, 114a, and 114b and TCUs 116 which may or may not have fully altitude compensating characteristics. For example polygon arrangements or straight line arrangements.

Figure 7:
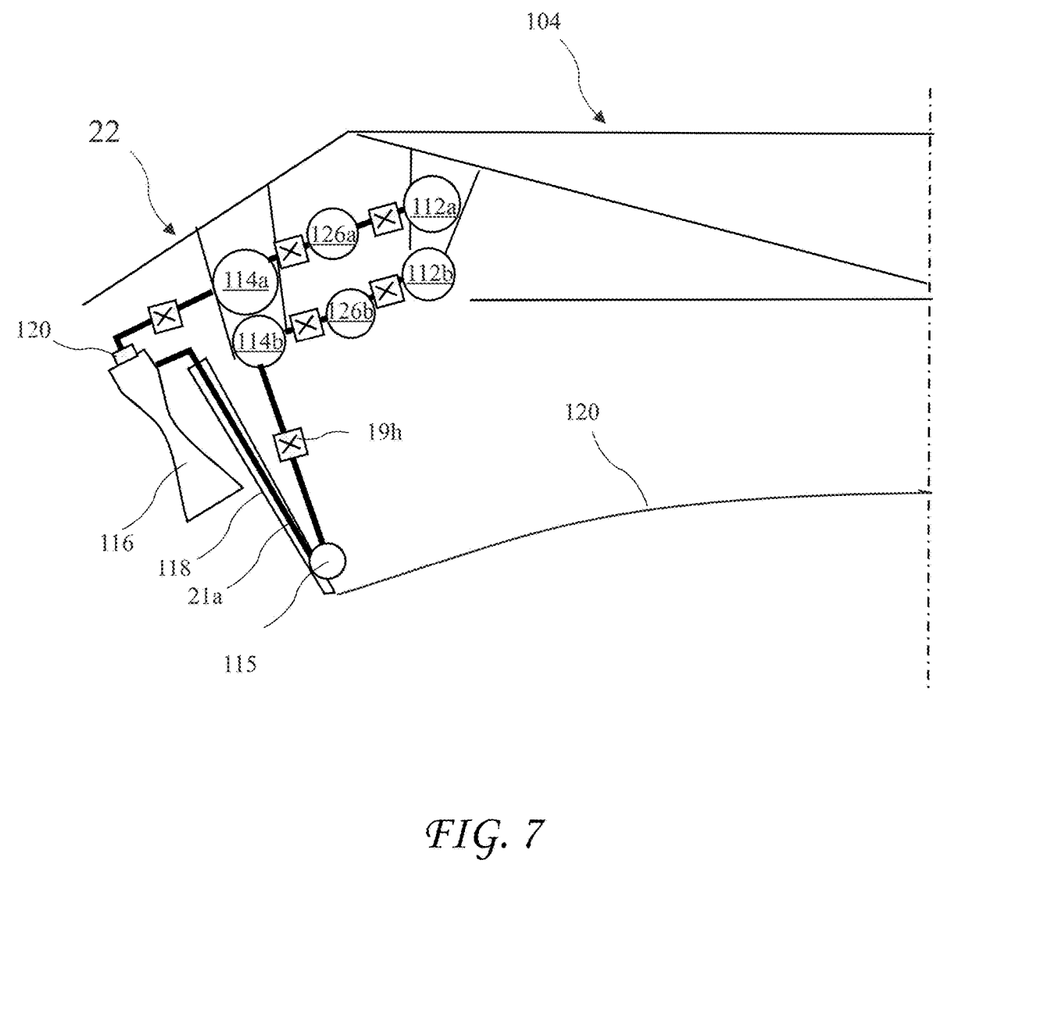
FIG. 7 shows functional items and physical interfaces of the primary propulsion unit according to the present invention.

All engine components have a physical arrangement and mechanical interfaces which facilitate the implementation of Line-Replaceable Unit (LRU) service methodology. FIG. 7 shows an arrangement of engine components which facilitate a high degree of LRU implementation. Individual PPU 22 components may be accessed and replaced as necessary based on health monitoring data gathered and analyzed in real-time during flights. Propulsion element LRUs are accessible through gimbal seal 26 (see FIGS. 8 and 9), and the BND 120 for removal and replacement by service crew members. The BND 120 may be one piece or comprise several segments individually removable.

The PPU 22 includes a multiplicity of, for example 16, electrically driven pumps 126a and 126b feeding from the Low Pressure Manifolds (LPM) 112a and 112b delivering their output to the High Pressure Manifolds (HPM) 114a and 114b. The pumps 126a and 126b are preferably electrically driven pumps to facilitate simplicity in pump design and function, and minimizes the total number of fluid flow control and combustion components. Electrical generation and storage components are mounted to airframe 16 to reduce pivoting or gimbaled mass. Oxidizer is directly routed to a multiplicity of TCUs 116 (preferably 64 TCUs) via a flow control valve 119d for each TCU 116. Fuel is routed via the HPM 114b and flow control valves 19h for each ZLN manifold section 115 and propellant line 21a. The fuel is gasified and simultaneously provides cooling for the ZLN 118 and TCU 116. Each TCU 116 is mounted to the thrust frame 104 with a thrust bearing mechanical interface 121 and has accommodation for ignition and propellant purge functions. Interfaces to HPM 114 may be flat face bolted flanges. Lines are preferably connected to manifolds and valves by V-band clamp flanges.

Alternative embodiments of the PPU 22 may use bipropellant or monopropellant gas generator, thrust chamber tapoff, expander, or staged combustion engine cycles with addition of associated components packaged in the PPU.

Figure 8:
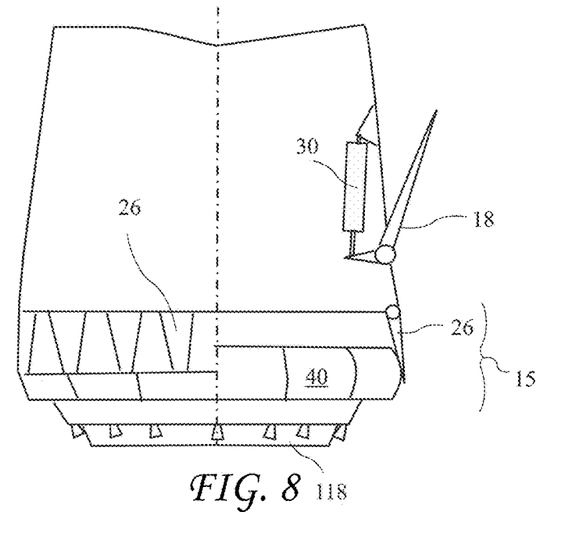
FIG. 8 shows an exterior aerodynamic control body flaps and propulsion unit gimbal seal/flaps according to the present invention.
Figure 9:
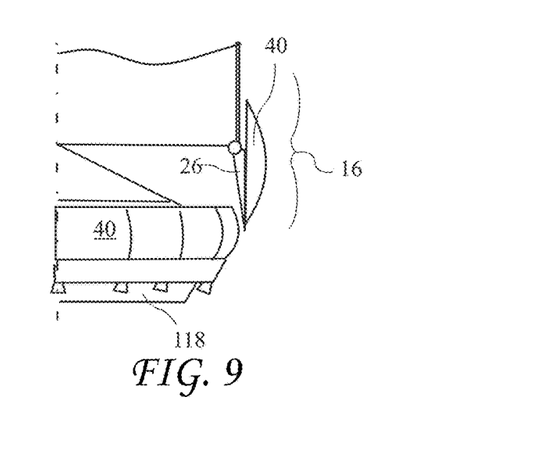
FIG. 9 shows a cross-sectional view of a physical arrangement of a primary propulsion unit gimbal seal flap and body flap according to the present invention.

FIG. 8 shows an Active OML Shape Control (AOSC) device 15 comprising an arrangement of flexible bladder segments 40 and seal flaps 26 on the OML of the vehicle 10. The PPU 22 pivot motion relative to the vehicle airframe 16 is accommodated by a series of inter-leaved seal flaps 26 which bear upon the PPU Skirt 28. Body flaps 18 (for example four body flaps) are hinged aerodynamic control surfaces used to provide attitude and roll control during base first atmospheric flight and are positioned by flap actuators 30, for example, linear actuators.

One feature of the vehicle 10 is the incorporation of a PPU 22 which provides atmospheric compensation during ascent. The specific aerodynamic characteristics are continuously variable during the ascent flight profile. Control and influence of these aerodynamic characteristic is achieved with bladder segments 40 shown in FIG. 9 and located in an aft section of the fuselage.

Figure 10A:
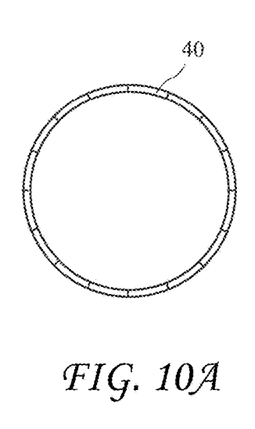
FIGS. 10A-10C show the seal flap with pneumatic bladder cells inflated to change Outer Mold Line (OML) shape according to the present invention.
Figure 10B:
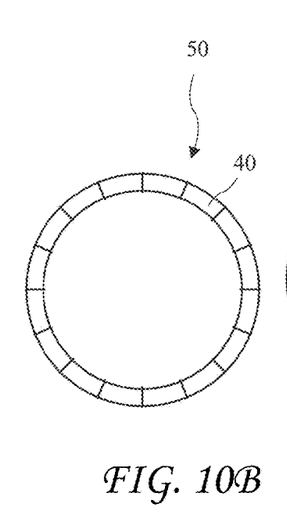
Figure 10C:
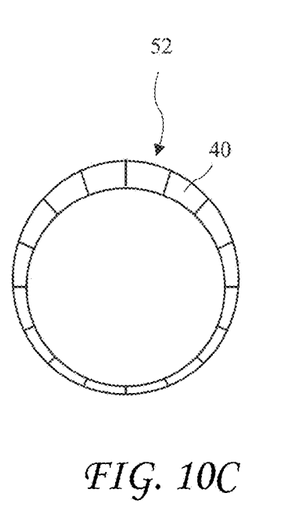

A series of flexible bladder segments 40 are arranged on the OML shown in FIGS. 10A-10C in an annular arrangement in the aft section 16 and covered by the seal flaps 26. The flexible bladder segments 40 are shown relaxed in FIG. 10A. Individual control of gas pressure to each bladder segment 40 of the AOSC can produce a symmetrical shape 50 shown in FIG. 10B or non-symmetrical shape 52 shown in FIG. 10C changes to the OML. In other embodiments a vehicle may not incorporate the AOSC device or may have other features which change the aerodynamic characteristics of the vehicle airframe thus affecting the PPU 22 exhaust plume thrust vector direction, or the overall effectiveness of altitude compensation.

Figure 11:
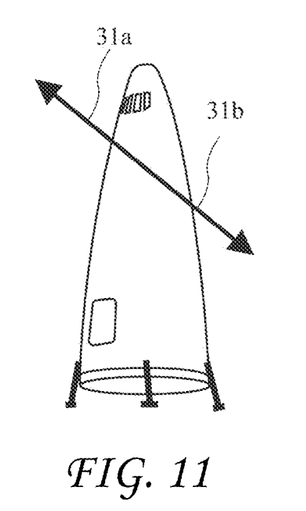
FIG. 11 shows a jettison system according to the present invention.
Figure 12:
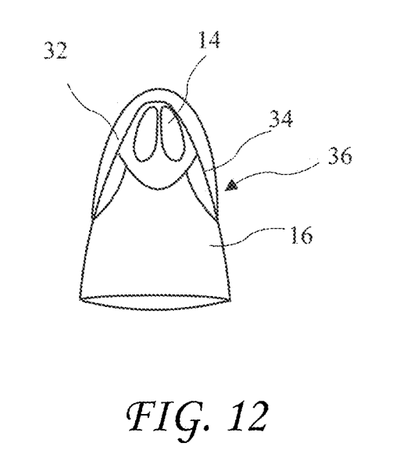
FIG. 12 shows the physical arrangement for a passenger escape capsule integrated with the flight vehicle according to the present invention.

A jettison may be provided for the capsule 14 either while on the ground or during the flight profile should a significant failure in the flight vehicle occur. The Vehicle 10 may include a parachute recovery subsystem for both the vehicle airframe 16 and capsule 14 as shown in FIGS. 11 and 12. Capsule 14 jettison may be achieved via dual guide rail, release latching mechanism, and bi-selectable directed rocket motor. On the ground and below a pre-set altitude the capsule 14 is jettisoned 'up and away' in direction 31a. Above the pre-set altitude the capsule may be jettisoned 'down and away' 31b. The vehicle airframe 16 is configured to provide a continuous and functional structure which is aerodynamically stable after the capsule jettison event. Parachute riser paths and attachment points 32 for the Vehicle Recovery Parachute (VRP) 36 located in two side volumes 34 on the VA 16.

The rocket providing the jettison impulse maybe a sold fuel motor, a liquid, bi or mono propellant engine and is preferably a solid fuel motor, or may use any thrusting device for up and away jettison, while using an aerodynamic device for down and away jettison.

Figure 13:
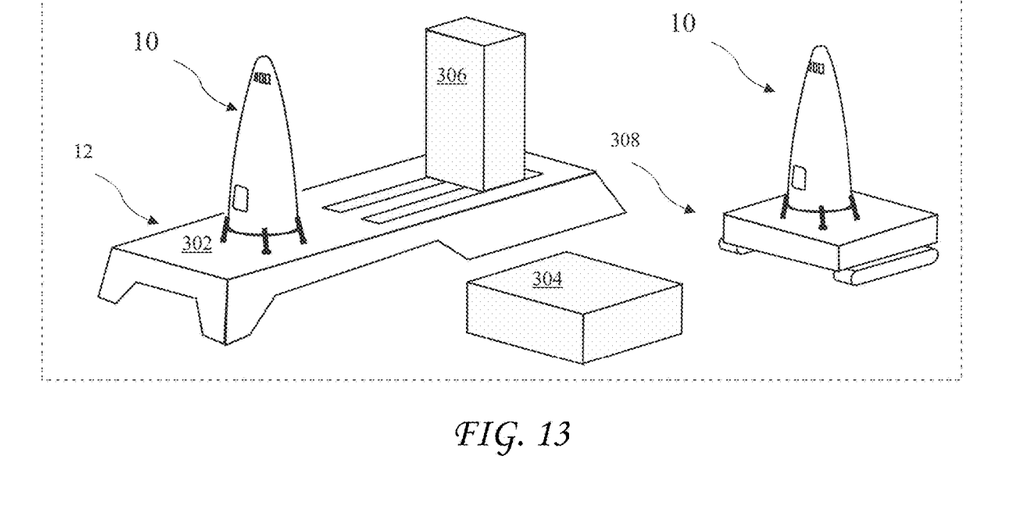
FIG. 13 shows a perspective view of elements of a ground operations facility according to the present invention.

A GOFS 12 embodiment FIG. 13 shows: a Flight Deck (FD) 302 which supports a Vehicle 10 resting upon it's extended landing gear 20, provides a flow path for exhaust gases, and houses consumable supply interfaces between the Vehicle 10 and the Consumables Handling and Storage Facility 304; a mobile/moveable Vehicle Maintenance Building 306 provides equipment storage and inclement weather shelter when moved to enclose the vehicle 10; a mobile vehicle transporter 308 may be used to transport an vehicle 10 as required for logistical purposes about the larger ground operations site.

Figure 14:
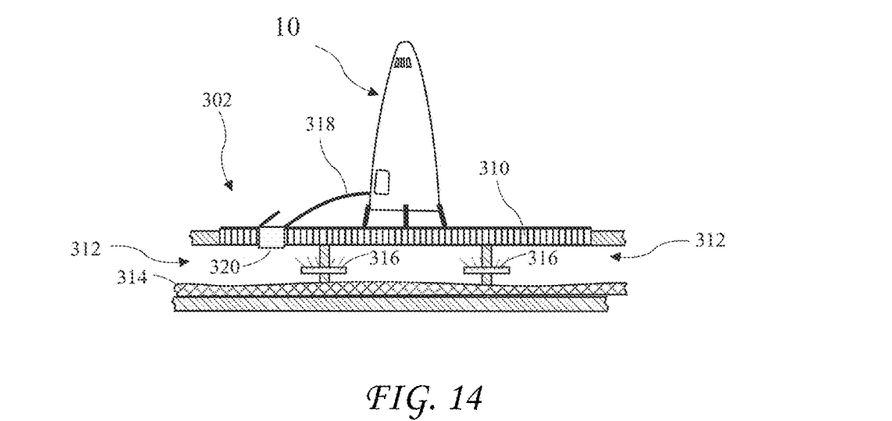
FIG. 14 shows a cross sectional view of the ground operations facility according to the present invention.

A cross-sectional view of the FD 302 is shown in FIG. 14 comprises a gas permeable Vehicle Support Surface (VSS) 310 which supports a Vehicle 10 upon it's landing gear, the VSS 310 is preferably a series of heavy steel grates. Below the VSS 310 is the Horizontal Exhaust Manifold (HEM) 312 being a volume or arrangement of ducts which route the Vehicle 10 exhaust gases in a horizontal plane away from the vehicle 10 and FD 302. Reduction of overall heat and acoustic loads transmitted to the vehicle 10 and reduction of the VSS 310 operating temperatures is achieved via a cooling water pond 314 and active cooling water spray devices 316 located within the HEM 312 and below the VSS 310. Consumables, electrical services are provided to the vehicle 10 via a service umbilical 318. The service umbilical 318 when released from the vehicle 10 is retracted into the umbilical storage box 320 providing environmental protection to the Service Umbilical during the take-off event.

Figure 15A:
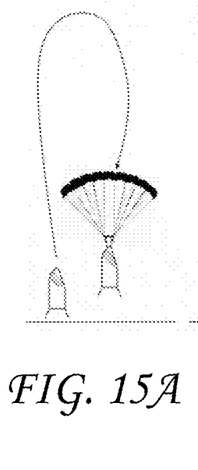
FIGS. 15A-15D show a concept of operations options for a flight vehicle embodiment including an escape capsule function and parachutes according to the present invention.
Figure 15B:
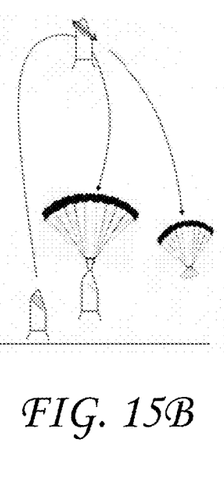
Figure 15C:
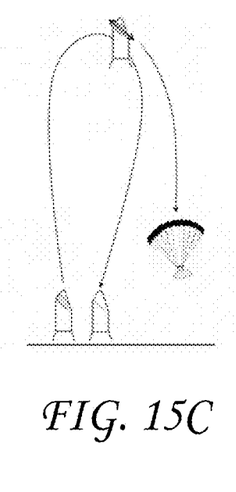
Figure 15D:
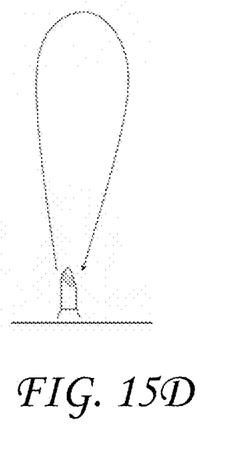

FIGS. 15A-15D show various Concept of Operation (CONOPS) of the vehicle 10. FIG. 15A shows a first CONOPS of the vehicle 10 employed in early flight envelope expansion and/or during off nominal flight conditions recovers the entire vehicle via a deployment of aerodynamic decelerator VRS 36. FIG. 15B shows a second CONOPS "B" of the vehicle 10 employed after a capsule 14 jettison event has occurred with both items being recovered via aerodynamic decelerators. FIG. 15C shows a third CONOPS "C" of the vehicle 10 employed after a capsule 14 jettison event and the vehicle 10 using aerodynamic decelerator recovery device and wherein the Vehicle 10 maintains capability for off-nominal powered landing. FIG. 15D shows a fourth CONOPS "D" the vehicle 10 in a fully nominal mission profile wherein no anomaly resulting in capsule jettison nor loss of primary propulsion capability to land and/or wherein sufficient system reliability may have been achieved that allows removal of all aerodynamic decelerator recovery devices from the system.

Figure 16:
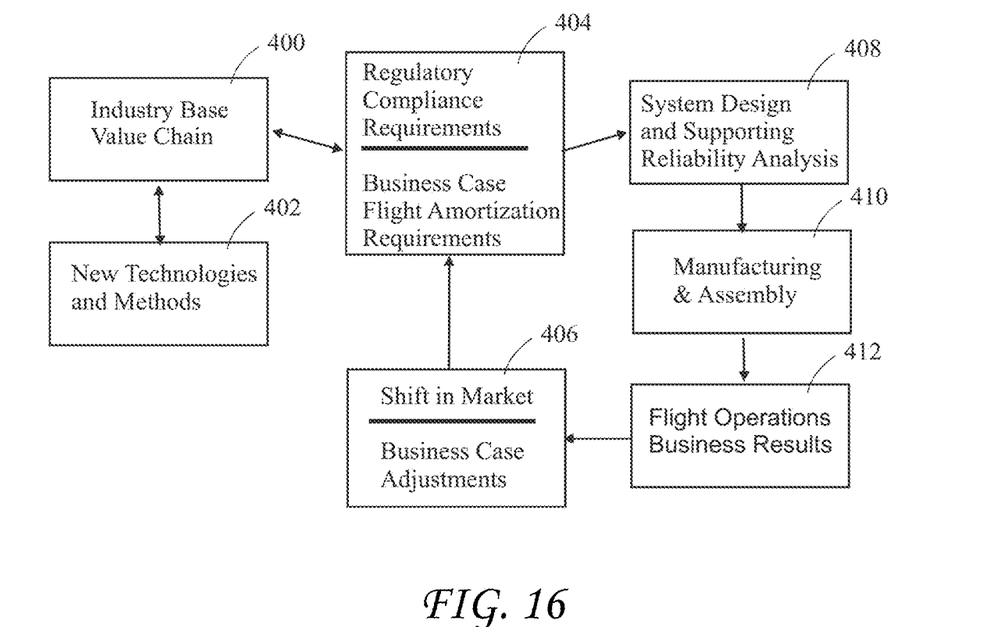
FIG. 16 shows a business method to produce the system embodiment according to the present invention.

A business process shown in FIG. 16 supports the physical system embodiment describe herein is based upon multiple business process known to the industry yet not combined in the manner shown. An industry base value chain 400 connects to new technologies and methods 402 and to regulatory compliance requirements and business case flight amortization requirements 404. Regulatory compliance requirements and business case flight amortization requirements 404 flow to System Design and Supporting Reliability Analysis 408, on to Manufacturing & Assembly 410, to Flight Operations Business Results 412 to Shift in Market Business Case Adjustments 406, and back to regulatory compliance requirements and business case flight amortization requirements 404.

The continuous availability of new technologies, materials and methods must be enabled in a supporting industry value chain. To do so the business must not be highly vertically integrated and the system design must be modular and scalable with industry standard interfaces developed so as to source from multiple suppliers and/or incorporate evolved/improved products. Regulatory requirements and the flight amortization of the flight vehicle must be known to provide the proper requirements for the system design. Aircraft industry methodologies for reliability and mission success estimates must be employed to achieve a system which functions at the necessary levels of mission success and does not rely significantly upon 'demonstrated' or 'flight leader' type methodologies.

Manufacturing and assembly must not be too vertically integrated and matched to the rather limited production quantities associated with the design amortization of the flight vehicle. Flight operations and business results may come from multiple operators and service provider locations and must be gathered and analyzed to provide feedback to regulatory agency compliance and the business case in general. Shift in market will drive major design parameters such as passenger capacity and mission needs.

While the invention herein disclosed has been described by means of specific embodiments and applications thereof, numerous modifications and variations could be made thereto by those skilled in the art without departing from the scope of the invention set forth in the claims.

I claim:

1. A rocket vehicle system, comprising:
a vehicle including an airframe, and a passengers capsule or a cargo capsule;
Primary Propulsion Unit (PPU) pivotally attached to the airframe, the PPU comprising:
a plurality of Thrust Chamber Units (TCUs) arranged around a perimeter of the PPU, the TCUs individually removable and replaceable while the vehicle resides on a Ground Operations Facility Segment (GOFS) in a launch configuration; and
a plurality of fluid pumps in fluid communication between at least one propellant tank and said TCUs through flow control valves individually removable and replaceable, and pumps individually removable and replaceable.

2. The rocket vehicle system of claim 1, wherein said PPU components are accessible and designed in a manner consistent with aviation industry Line Replaceable Unit (LRU) operational requirements.

3. The rocket vehicle system of claim 1, wherein the plurality of fluid pumps are in fluid communication between said at least one propellant tank and said TCUs through common fluid manifolds.

4. The rocket vehicle system of claim 3, wherein:
the manifolds comprise a low pressure manifold in fluid communication with the propellant tank;
the fuel pumps are in parallel fluid communication between the low pressure manifold and a high pressure manifold; and
the high pressure manifold is in fluid communication with the TCUs.

5. The rocket vehicle system of claim 4, wherein the low pressure manifold and the high pressure manifold form closed circuits.

6. The rocket vehicle system of claim 4, wherein:
the propellant comprises an oxidizer and a fuel; and
the fuel is in fluid communication with the TCUs through independent manifold sections, each manifold section in fluid communication with a corresponding section of the TCUs.

7. The rocket vehicle system of claim 6, wherein a fuel path between the manifold sections and the TCUs passes through a Zero Length Nozzle (ZLN) in a base of the PPU, the fuel path is configured to cool the ZLN.

8. The rocket vehicle system of claim 4, wherein the fluid pumps are individually controlled in either an active or an inactive state.

9. The rocket vehicle system of claim 4, wherein the active or inactive state is determined via a means of real time health monitoring and associated electronic/software control subsystem.

10. The rocket vehicle system of claim 1, further including an Active OML Shape Control (AOSC) device comprising:
a PPU skirt comprising multiplicity of deformable segments; and
overlapping seal-flaps attached to the airframe and vertically overlapping the PPU skirt.

11. The rocket vehicle system of claim 10, wherein the AOSC device is variable to provide a symmetrical shape and a non-symmetrical shape to change aerodynamic characteristics of the vehicle.

12. The rocket vehicle system of claim 1, further including a ground facility segment which supports the vehicle, comprising a free lift off of vehicle from a supporting ground plane, wherein the ground plane is a gas permeable supporting surface, exhaust ducting and active cooling equipment for purposes of significantly reduced thermal heating load upon vehicle during take off/landing events.

13. A rocket vehicle system, comprising:
a vehicle including an airframe, and a passengers capsule or a cargo capsule;
Primary Propulsion Unit (PPU) pivotally attached to the airframe, the PPU comprising:
a plurality of Thrust Chamber Units (TCUs) arranged around a perimeter of the PPU, the TCUs individually removable and replaceable while the vehicle resides on a Ground Operations Facility Segment (GOFS) in a launch configuration;
a fuel tank;
an oxidizer tank;
a low pressure fuel manifold in fluid communication with the fuel tank through a multiplicity of independently controlled first fuel valves, the low pressure fuel manifold forming a continuous closed circuit;
a high pressure fuel manifold in communication with the low pressure fuel manifold through a multiplicity of independently controlled parallel fuel pumps and independently controlled second fuel valves;
the high pressure fuel manifold in communication with independent manifold sections, each manifold section in fluid communication with a corresponding section of the TCUs, through a multiplicity of independently controlled fourth fuel valves;
a low pressure oxidizer manifold in fluid communication with the oxidizer tank through a multiplicity of independently controlled first oxidizer valves, the low pressure oxidizer manifold forming a continuous closed circuit;
a high pressure oxidizer manifold in communication with the low pressure oxidizer manifold through a multiplicity of independently controlled parallel oxidizer pumps and independently controlled second oxidizer valves; and
the high pressure oxidizer manifold in communication with the TCUs, through a multiplicity of independently controlled fourth oxidizer valves.

14. A rocket vehicle system, comprising:
a vehicle including an airframe, and a passengers capsule or a cargo capsule;
Primary Propulsion Unit (PPU) pivotally attached to the airframe, the PPU comprising:
a plurality of Thrust Chamber Units (TCUs) arranged around a perimeter of the PPU, the TCUs individually removable and replaceable while the vehicle resides on a Ground Operations Facility Segment (GOFS) in a launch configuration;
a plurality of fluid pumps in fluid communication between at least one propellant tank and said TCUs through flow control valves individually removable and replaceable, and pumps individually removable and replaceable; and
an Active OML Shape Control (AOSC) device comprising:
a PPU skirt comprising multiplicity of deformable segments circling the PPU; and
overlapping seal-flaps attached to the airframe and vertically overlapping the PPU skirt, the AOSC device is variable to provide a symmetrical shape and a non-symmetrical shape to change aerodynamic characteristics of the vehicle.

* * * * *